United States Patent

[11] 3,601,455

[72] Inventor Rudolf Spieth
  12 Kennenberg Str., D 7300 Esslingen (Neckar)-Kennenburg, Germany
[21] Appl. No. 813,413
[22] Filed Apr. 4, 1969
[45] Patented Aug. 24, 1971
[32] Priority Apr. 11, 1968
[33] Germany
[31] P 17 50 244.2

[54] DEVICE FOR ADJUSTING THE SIZE OF A BEARING CLEARANCE BETWEEN TWO ELEMENTS
15 Claims, 5 Drawing Figs.

[52] U.S. Cl. .................................................. 308/3 R, 308/65
[51] Int. Cl. .................................................. F16c 27/06
[50] Field of Search .................................... 308/3, 3 A, 63–66, 71, 237; 82/32

[56] References Cited
UNITED STATES PATENTS
3,030,155 4/1962 Bullard .......................... 308/3
3,046,062 7/1962 Wettstein ...................... 308/4
3,089,739 5/1963 Spieth .......................... 308/65 X
3,326,032 6/1967 Stuhldreher .................. 308/3 X
3,404,602 10/1968 Burns .......................... 308/3 X
3,449,031 6/1969 Josephson .................... 308/237
3,511,544 5/1970 Marley ........................ 308/3
FOREIGN PATENTS
699,831 11/1953 Great Britain ................ 308/63

Primary Examiner—Manuel A. Antonakas
Attorney—Werner W. Kleeman

ABSTRACT: A striplike adjusting key for varying the size of the bearing clearance between the adjacent surfaces of a slide carriage and a fixed guide block so as to be movable relative to each other at different degrees of friction or to lock them to each other. The key is substantially meander shaped by being provided with narrow transverse recesses in its opposite sides, and its ends may be pressed toward each other by tightening screws so as to cause a buckling effect whereby some parts of the remaining opposite longitudinal surfaces of the key are more or less pressed against the adjacent surface of the slide carriage and of the guide block, respectively.

PATENTED AUG 24 1971

3,601,455

INVENTOR.
Rudolf Spieth
BY Jacobi & Davidson

DEVICE FOR ADJUSTING THE SIZE OF A BEARING CLEARANCE BETWEEN TWO ELEMENTS

The present invention relates to a device for adjusting the size of a bearing clearance between two elements and especially between a slide carriage and a guide way on a machine by means of a flat striplike adjusting key which is disposed between these elements and has two opposite wider sides at least one of which substantially engages with one of these elements.

It is an object of the present invention to provide an adjusting device of the type as described above which permits the size of a clearance extending in a longitudinal direction between two elements, and especially between a slide carriage and a guide block of a machine, to be very accurately and uniformly varied from a relatively large clearance to a very small clearance if any, or which may be adjusted so as to engage with such a pressure upon both elements that they will be firmly locked together.

According to the invention, this object is attained by providing the adjusting key preferably in the form of a single strip of a suitable material which has two opposite wider longitudinal sides in which narrow transverse recesses are provided which extend in opposite directions to each other and are offset from each other as seen in the longitudinal direction of the key so as to form at least one intermediate transverse web, and have such a depth that the remainder of the material between the bottom of each recess and the adjacent side of the key forms a slightly resilient joint. The remaining outer surfaces of these wider opposite sides remain at all times substantially plane and, as long as no forces are exerted upon the key to deform the same, these remaining surfaces of each of these sides are disposed within a common plane which extends parallel to the common plane of the remaining surfaces of the other side of the strip. For deforming the adjusting strip, the invention provides that compressive forces are to be exerted thereon substantially in one of its main directions and especially in its longitudinal direction.

Another object of the invention is to provide such an adjusting key of a construction and shape which may be easily manufactured and to provide very simple means for mounting such an adjusting key in the position in which it is desired and for manipulating it so as to carry out the desired function. Depending upon the length of the slide carriage, it is possible to provide the adjusting key either in the form of a single adjusting strip or of several adjusting strips substantially in longitudinal alignment with each other and either in engagement with or spaced from each other. At least each of these adjusting strips may be adjusted so as to provide at all times a uniform clearance between the two elements, for example, between the associated surfaces of a guide block and a slide carriage and the entire adjusting key may extend along the entire length of the slide carriage. Even if this clearance is adjusted so as to be very small, the adjusting key according to the invention is designed so as to avoid any scraping of any of its parts on the guide surface or surfaces of the guide block when the slide carriage or similar element is moved along the latter. Another feature of the invention consists in designing the adjusting key so that when compressed in its longitudinal direction the ends of its individual longitudinal surfaces facing the associated guide surfaces of the guide block will be bent slightly away from the latter and will thereby define a wedge-shaped gap for holding a lubricant.

According to another feature of the invention, the adjusting key is provided with a plurality of transverse recesses so as to form at least two intermediate transverse webs adjacent to each other which are spaced from each other at a distance greater than the width of the open end of each of two recesses facing the other longitudinal side of the key. This has the advantage that wide guide surfaces are formed on the guide block and on the adjusting key which are slidable relative to each other. These guide surfaces may be made of a soft material or be hardened or coated with a layer of plastic or the like.

Another feature of the invention for attaining wide flat guide or gliding surfaces on the side of the adjusting key facing the guide surfaces of the guide block consists in designing the key so that between two transverse webs which are separated by a transverse recess the key is provided with a supporting part which, when the key is not deformed by being compressed in its longitudinal direction, has a height equal to that of the webs. Consequently, when the key is compressed, the supporting part will not be deformed, and will therefore have a plane guide or gliding surface facing the associated surface of the guide block.

This supporting part is preferably made of a greater length than the other parts of the adjusting key which are divided by transverse recesses, and the plane surface which is slidable along the guide surface of the guide block and is formed by this supporting part and possibly also by the adjacent connecting parts which are defined by the bottoms of the recesses in the other side will therefore have a considerable width.

In order to improve the lubrication of the adjacent guide or gliding surfaces, the invention further provides that the surfaces of the last-mentioned connecting parts of the adjusting key facing the guide surface of the guide block are slightly inclined relative to and away from this guide surface and together with the latter define pockets for holding a lubricant from which the lubricant may easily pass to the associated guide or gliding surfaces.

Another important feature of the invention consists in clamping the adjusting key in such a manner that the entire length of its supporting surfaces facing the slide carriage will extend parallel to its opposite guide or gliding surfaces. This may be attained by providing means for releasably securing the central part of the adjusting key to the slide carriage, by providing the side of the key facing the guide surface of the guide block at both lateral sides and adjacent to the central part with a pair of transverse recesses and the opposite side of the key facing the slide carriage with at least another pair of transverse recesses so that a transverse web is formed at each lateral side of this central part, and by exerting compressive forces upon both ends of the key in opposite longitudinal directions to each other. These compressive forces may be exerted either centrally upon the opposite ends of the key or at one side of the longitudinal axis of the key.

Another feature of the invention consists in providing means for exerting an adjustable pressure in opposite longitudinal directions upon the opposite ends of the key so as to adjust the clearance between the key and the guide surface of the guide block to a particular desired size, and to provide additional means, preferably at the center of the length of the key, for expanding the key in its longitudinal direction independently of and against the action of the first means so that, when the additional means are tightened, the adjusting key will clamp the slide carriage rigidly to the guide block and when these additional means are again released, the clearance as originally set by the first means will be reestablished and the slide carriage will again be slidable along the guide block. For this purpose, it is preferable to divide the adjusting key into two substantially coaxial sections of a substantially equal length and to insert a tightening element between them which when tightened from the outer side of the slide carriage, exerts a wedging action upon their inner ends so that the two sections will be pressed outwardly and against the normal tightening means whereby an additional buckling effect of the two sections will be produced which locks the slide carriage to the guide block.

A further feature of the invention consists in partly filling at least the transverse apertures within the central area of the adjusting key and facing the guide surface of the guide block with a sealing compound in a manner so as to prevent any lubricant from escaping laterally to the outside.

These and additional features and advantages of the present invention will become further apparent from the following detailed description thereof which is to be read with reference to the accompanying diagrammatic drawings, in which FIG. 1 shows an end view of a slide carriage, its guide block, and the adjusting means according to a first embodiment of the invention;

FIG. 4 shows a cross section which is taken along the line IV—IV of FIG. 3; while

Figure 1:
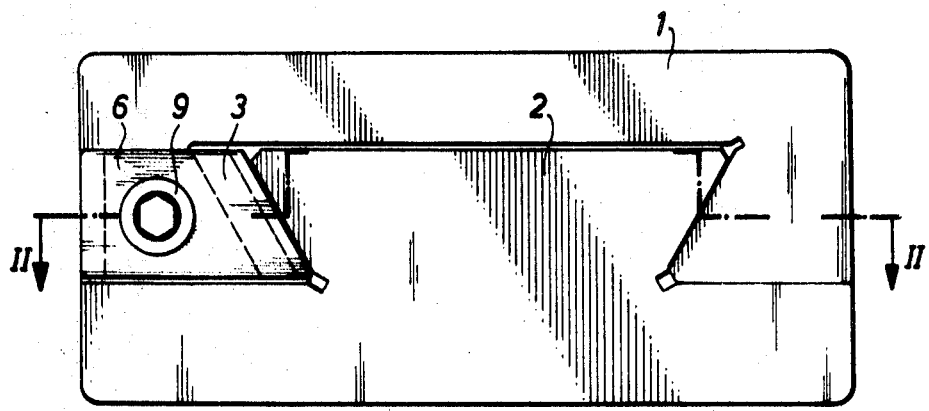
Figure 2:
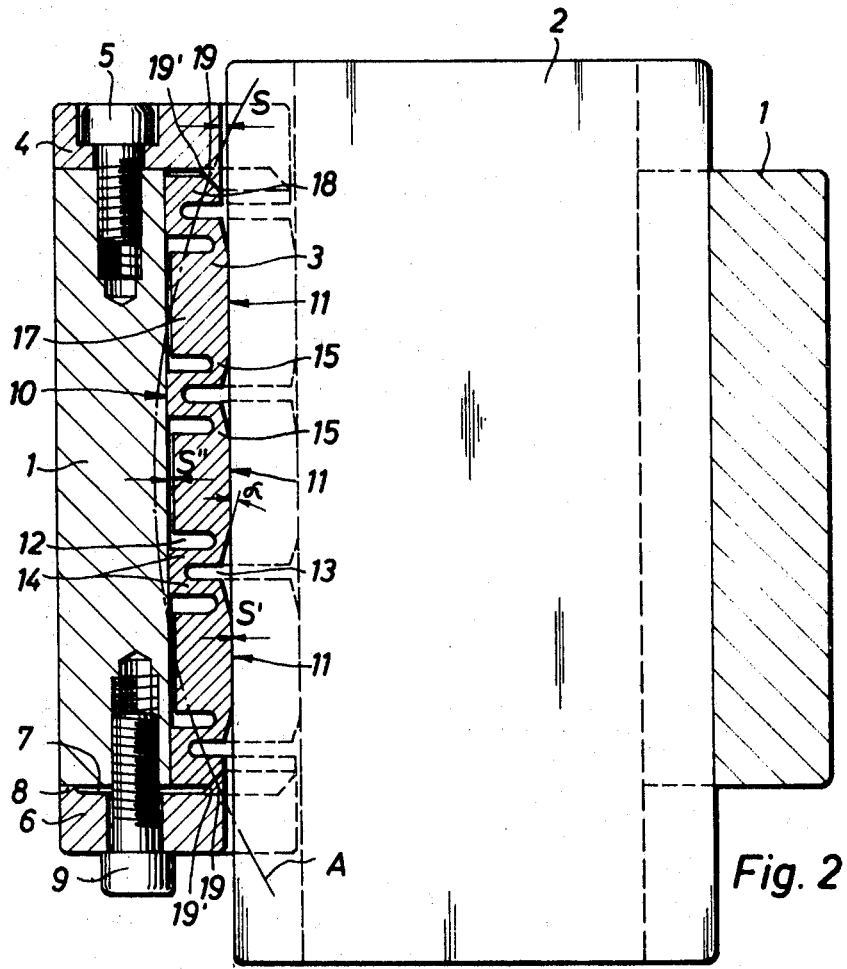
FIG. 2 shows a cross section which is taken along the line II—II of FIG. 1.

As illustrated in FIGS. 1 and 2 of the drawings, a carriage 1 is mounted on a fixed guide block 2 of a machine so as to be slidable relative to the latter in a direction vertical to the plane of FIG. 1 by being frictionally connected to the guide block 2 by means of associated dovetailed surfaces on these two parts. At the left side of guide block 2, as seen in FIGS. 1 and 2, a striplike adjusting key 3 is interposed between the dovetailed surfaces on carriage 1 and guide block 2. One end of this adjusting strip 3 abuts against a stop plate 4 which is secured by a screw 5 to the carriage 1, while at the opposite end of carriage 1 the adjusting key 3 is clamped thereto by means of a clamping plate 6 and a screw 9. The side of clamping plate 6 facing the carriage 1 is provided with a substantially central recess 7 between an outer projection 8 and an inner inclined projection 19'. In its clamped position as shown in FIG. 2, the adjusting key 3 engages at one side partly upon the inclined supporting surface 10 on carriage 1 and at the other side partly upon the inclined guide surface 11 on guide block 2.

The adjusting key 3 is provided are one side with slot-shaped transverse recesses 12 the open ends of which face the supporting surface 10 on carriage 1, and at the opposite side with similar transverse recesses 13 the open ends of which face the guide surface 11 on guide block 2. The adjacent recesses 12 and 13 at the opposite sides of the adjusting key are separated from each other by an intermediate web 14, and the central part of the adjusting key is provided between two adjacent recesses 12 facing the supporting surface 10 on carriage 1 with one recess 13 facing the guide surface 11 on block 2 so that two adjacent webs 14 are formed. At least the recesses 12 are made of such a depth that the small web 15 between the bottom of each recess 12 and the other side of the adjusting key 3 forms a slightly resilient joint. The different recesses 12 may be made of different depths and then also of different widths. It has been found to be of advantage to increase the thickness of the joints 15 from the center of the adjusting key 3 toward its opposite ends in order to prevent the guide surfaces 11 from tilting relative to each other.

Each pair of adjacent webs 14 may be separated by a bearing part 17 which, when the adjusting key is deformed and in a clamping position, has substantially the same height as the webs and insures that the parts of the key which are slidable along the guide surface of the guide block 2 form wide gliding surfaces. On its opposite outer ends, the adjusting key 3 is providing with end portions 18 each of which is provided with an inclined surface 19 which engages with and is acted upon by a wedge-shaped projection 19' on the stop plate 4 and on the clamping plate 6.

When the adjusting key 3 is in its uncompressed position, not shown, the outer surface parts of each of its opposite sides are disposed within a common plane. The adjusting strip serves for changing the clearance S which exists originally between its inner bearing surfaces and the adjacent guide surface 11 on guide block 2 when key 3 is not compressed, to a final clearance S', if any. When screws 9 are tightened and a pressure is exerted by the wedge-shaped parts 19' on plates 4 and 6 upon the inclined end surfaces 19 of the adjusting key 3, the latter will tend to bend to a shape substantially in accordance with the dot-and-dash line A. This results in a buckling displacement of the parts at one side of key 3 which embrace the recesses 13 so as to bear against the carriage 1 and of the bearing parts 17 on the other side of key 3 so to bear against the guide block 2.

When compressing the adjusting key 3 in this manner, the parts thereof adjacent to the edges of recesses 13 will be bent so as to form inclined surfaces on which lubricating cushions may form. The lubricating effect may be improved by additionally inclining the surface parts adjacent to the edges of recesses 13 at a small angle and relative to the plane of the bearing parts 17 by slightly grinding these parts. In order to prevent losses of lubricant, the sides of recesses 13 may be closed by suitable sealing means so that these recesses will then form lubricant pockets. It is also possible to fill the recesses 13 partly or entirely with an elastic compound which is solid at a normal outside temperature.

By applying an additional force from the outside upon the clamping plate 6, by suitable means, not shown, the adjusting key 3 may be bent to such an extent as to lock the carriage 1 in a fixed position relative to the guide block 2. After this additional force is relieved, the original adjustment carriage 1 and guide block 2 will be reestablished.

Figure 3:
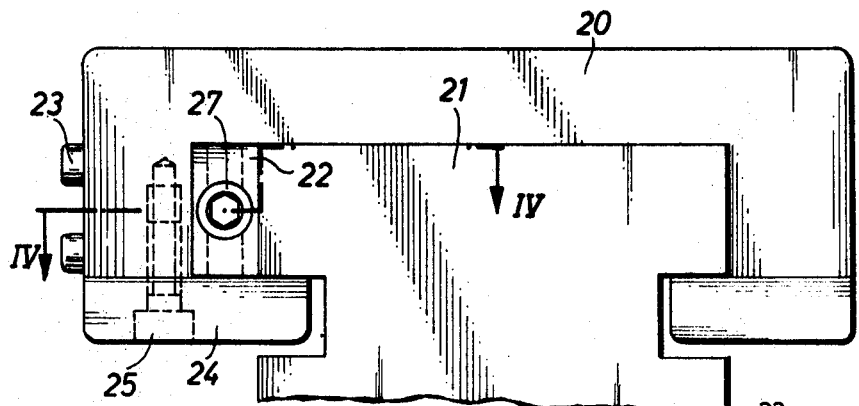
FIG. 3 shows an end view of a slide carriage, its guide block, and the adjusting means according to a second embodiment of the invention.
Figure 4:
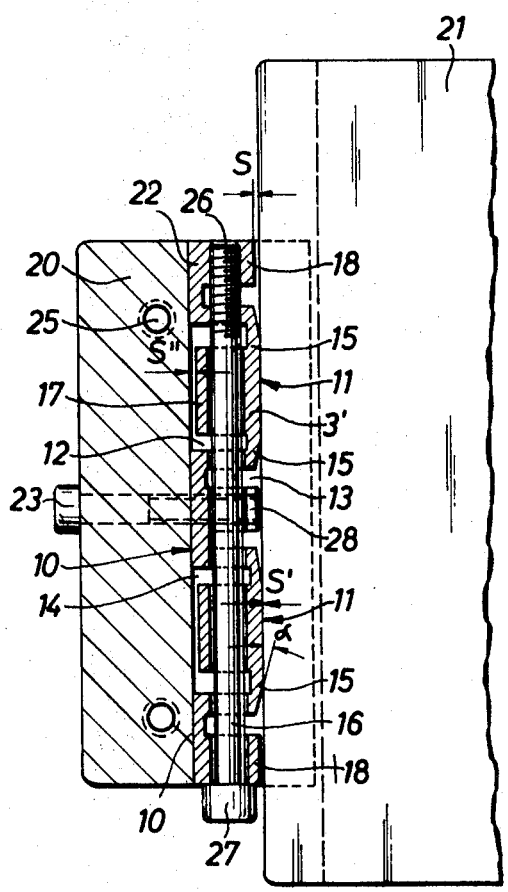

According to the second embodiment of the invention as illustrated in FIGS. 3 and 4, the associated surfaces of the slide carriage 20 and of the fixed guide block 21 of the machine are not made of a dovetailed shape as shown in FIGS. 1 and 2 but of a rectangular shape. This requires holding strips 24 to be secured to the lower side of carriage 20 by means of screws 25. Into the gap between carriage 20 and guide block 21a striplike adjusting key 3' is inserted which is provided with a longitudinal bore through which a clamping screw 27 extends, the head of which abuts against one end surface of the adjusting key, while the other threaded end 26 is screwed into the threaded portion 22 at the other end of the adjusting key. In FIG. 4, this adjusting key 3' is illustrated in the clamped or compressed position.

The different parts of the adjusting key 3' which are marked by the same numerals as those of the adjusting key 3 according to FIG. 1 and 2 also have the same purpose and effect as those of the key 3. The adjusting key 3' differs from the key 3 merely by being secured at the center of its length to the carriage 20 by means of a screw 23 whereby, when the latter and the clamping screw 27 are tightened, the adjusting key 3' will be bent similarly as described with reference to the line A in FIG. 2 and the end portions of key 3' will be separated from the fixed guide block 21 by a clearance S, while the guide surfaces 11 on the bearing parts 17 will be separated from guide block 21 by a clearance S', if any, and the bearing parts 17 will be separated from the carriage 20 by a clearance S''.

Figure 5:
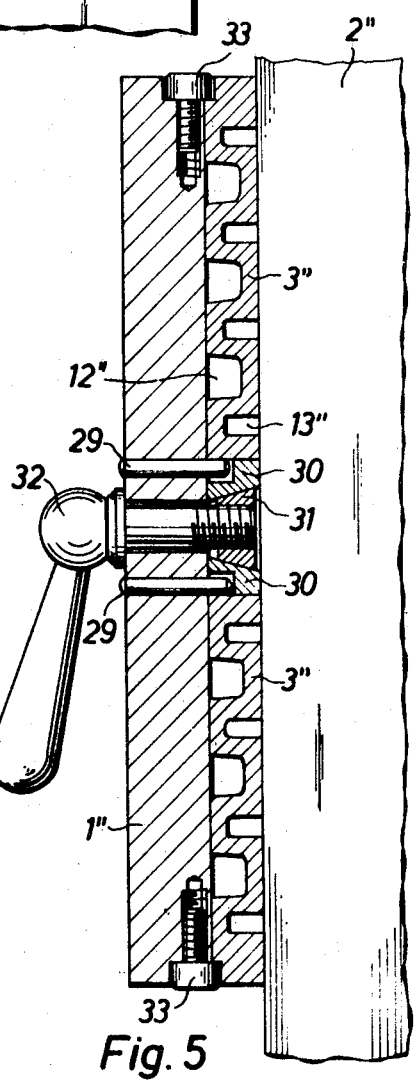
FIG. 5 shows a cross section similar to that as shown in FIG. 2, but of a third embodiment of the invention in which for the purpose of illustration the clearance between the adjusting key and the adjacent surfaces of the slide carriage and the guide block is omitted.

The third embodiment of the invention as illustrated in FIG. 5 comprises a fixed guide block 2'', a carriage 1'' which is slidable thereon, and between these two elements an adjusting key 3'' which id divided into two sections each of which is provided with slot-shaped transverse recesses 12'' and 13'' in the opposite sides of this key. The ends of these two sections which face each other abut against separate stop pins 29, and each of these sections may be pressed in its longitudinal direction toward its inner end and against its stop pin 29 by a screw 33 which is screwed into the outer end of the slide carriage 1'' and the head of which acts upon the outer end of the respective key section 3'' at a point laterally spaced from the longitudinal axis of the key.

The two sections 3'' of the adjusting key are separated from each other by a pair of wedge members 30 between which a tightening wedge 31 is inserted into which a tommy screw 32 is screwed. The wedge members 30 may also be integral with the adjusting strip sections 3''.

The tightening screws 33 are adjusted in accordance with the desired clearance to permit the carriage 1'' to be slidable with a certain friction along the guide surface of the guide block 2''. If, however, the slide carriage 1'' is to be locked in a fixed position relative to the guide block 2'', the tommy screw 32 is tightened, whereby an additional pressure is exerted upon the inner ends of the two key sections 3″ so as to bend or buckle the same and thereby to clamp the slide carriage 1″ rigidly to the guide block 2″. As soon as the tommy screw 32 is again loosened, the original adjustment of the key sections 3″ by the tightening screws 33 will be reestablished and the slide carriage 1″ will again be slidable relative to the guide block 2″ with the same friction as prior to the locking operation.

Although in FIG. 5 the adjusting key is divided into two separate sections 3″ in order to permit the sliding carriage to be quickly locked to and unlocked from the guide block 2″, the adjusting key if made of a suitable resilient material may also be expanded or contracted by the tommy screw 32 to produce the locking or releasing effect as previously described even if the two key parts 3″ are integral with each other and a conical or wedge-shaped part is inserted into a corresponding aperture which is provided substantially at the center of the length of this key.

Although my invention has been illustrated and described with reference to the preferred embodiments thereof I wish to have it understood that is is in no way limited to the details of such embodiments but is capable of numerous modifications within the scope of the appended claims.

Having thus fully disclosed my invention, what I claim is:

1. A device for adjusting the size of a bearing clearance between two adjacent substantially straight parallel surfaces of a pair of elements one of which is normally slidable along the other, normally fixed, element, comprising a striplike key disposed between said surfaces and having a pair of opposite wider sides and transverse recesses extending in opposite directions to each other from said opposite sides and spaced from each other in the longitudinal direction of said key, each of said recesses in one side of said key being separated from an adjacent recess in the other side by a transverse web, each of said recesses having such a depth that the material remaining between the bottom of said recess in one side and the surface of the opposite side forms a slightly resilient joint the remainder of said opposite sides of said key being disposed at all times substantially plane and parallel to each other, means for releasably securing said key to one of said elements, and means for exerting a pressure at least upon the opposite ends of said key in opposite substantially longitudinal directions thereof so as to deform said key by bending said joints and thereby displacing said remaining outer surfaces in transverse directions relative to each other and thereby to vary the size of said bearing clearance.

2. A device as defined in claim 1, in which the remainder of said opposite sides of said key are disposed within two parallel straight planes as long as no forces are exerted upon said key to deform the same.

3. A device as defined in claim 2, in which said key has a plurality of said transverse recesses in each of said sides so as to form at least two intermediate transverse webs which are spaced from each other at a distance greater than the width of the open end of each of two of said recesses in the other side of said key.

4. A device as defined in claim 1, in which said pressure-exerting means are mounted on said slidable element and act upon said ends of said key at points laterally adjacent and spaced from the central axis of said key.

5. A device as defined in claim 4, in which at least a part of each end of said key has an inclined surface, said pressure-exerting means comprising a pair of clamping plates each having an inclined surface part engaging upon one of said inclined surfaces of said key, and means for mounting said clamping plates on the opposite ends of said slidable element and for tightening at least one of said plates on one end of said slidable element and for thus pressing said inclined surface parts of said clamping plates against said inclined end surfaces of said key.

6. A device as defined in claim 5, in which one of said clamping plates is removably secured to one of said ends of said slidable element and has said inclined surface adjacent to one lateral side thereof and projecting toward one end of said key so as to engage with the inclined end surface thereof said clamping plate having a projection adjacent to the other lateral side adapted to abut against one end of said slidable element when said clamping plate is tightened by said tightening means, said clamping plate then pressing its inclined projecting surface with a lever action against said inclined end surface of said key.

7. A device as defined in claim 1, in which said key has a longitudinal bore substantially coaxial thereto said pressure-exerting means comprising a tightening screw extending through said bore and substantially transversely through said recesses.

8. A device as defined in claim 1, further comprising sealing means at least partly filling at least some of said recesses in said of said key facing said surface of said fixed element for preventing a lubricant from escaping to the outside.

9. A device as defined in claim 1, in which said recesses in a central part of said side of said key facing said slidable element have a greater length than those in the outer parts near the ends of said key.

10. A device as defined in claim 1, in which said pressure-exerting means further comprise at least one locking element extending through a transverse aperture in said key intermediate and spaced at a considerable distance from its ends and also through an aperture extending transversely through said slidable element to the outer side thereof, said locking element having wedging surfaces adapted to engage upon the wall of said aperture in said key, and means on said locking element for tightening the same a said outer side of said slidable element and for thereby pressing said wedging surfaces against the wall of said key aperture so as to expand said key against said first pressure-exerting means acting upon the ends of said key, whereby as long as said locking element is tightened, said key is additionally deformed so as to lock said slidable element in a fixed position to said fixed element.

11. A device as defined in claim 1, in which said key is divided transversely into at least two sections at a considerable distance from its outer ends, said pressure-exerting means further comprising a wedging member having inclined surfaces interposed between the adjacent inner ends of said key sections, a locking screw extending from the outer side of said slidable element through a transverse bore in said slidable element ad threaded into said wedging member, and means on the outer end of said locking screw for turning said screw and for thereby drawing said wedging member against said inner ends of said key sections and for thereby wedging said key sections further apart against said first pressure-exerting means acting upon the outer ends of said key sections, whereby as long as said wedging member is tightened by said locking screw, said key is additionally deformed so as to lock said slidable element in a fixed position to said fixed element.

12. A device for adjusting the size of a bearing clearance between two adjacent substantially straight parallel surfaces of a pair of elements one of which is normally slideable along the other normally fixed, element, comprising, a striplike key disposed between said surfaces and having a pair of opposite wider sides and transverse recesses extending in opposite directions to each other from said opposite sides and spaced from each other in the longitudinal direction of said key, each of said recesses in one side of said key being separated from an adjacent recess in the other side by a transverse web, each of said recesses having such a depth that the material remaining between the bottom of said recess in one side and the surface of the opposite side forms a slightly resilient joint, the remainder of said opposite sides of said key being disposed at all times substantially plane and parallel to each other, said remainder of said opposite sides of said key being disposed within two parallel straight planes as long as no forces are exerted upon said key to deform the same, means for releasably securing said key to one of said elements, and means for exerting a pressure at least upon the opposite ends of said key in opposite substantially longitudinal directions thereof so as to deform said key by bending said joints and thereby displacing said remaining outer surfaces in transverse directions relative to each other and thereby to vary the size of said bearing clearance, said key having a plurality of said transverse recesses in each of said sides so as to form at least two intermediate transverse webs which are spaced from each other at a distance greater than the width of the open end of each of two of said recesses in the other side of said key, at least two of said transverse recesses being disposed adjacent to each other in a first of the two sides of said key, said adjacent recesses being spaced at a considerably distance from each other so that the intermediate part forms a solid supporting part which is not deformed when said pressure is exerted upon said ends of said key.

13. A device as defined in claim 12 in which said supporting part has a greater length than the other parts of said key which are separated from each other by transverse recesses, one side of said supporting part at the second side of said key having a plane surface facing and adapted to slide along said surface of said fixed element, 14. A device as defined in claim 13, in which said slidable side of said supporting part is likewise disposed between a pair of adjacent recesses which are spaced from each other at a distance greater than said adjacent recesses in said first side of said key, and connecting parts connecting the ends of said slidable side to the edges of the open ends of said last recesses, said connecting parts having at all times slightly inclined surfaces so that said edges are recessed from the plane of said slidable said and cannot scrape said surface of said fixed element 15. A device for adjusting the size of a bearing clearance between two adjacent substantially straight parallel surfaces of a pair of elements one of which is normally slidable along the other, normally fixed, element, comprising a striplike key disposed between said surfaces and having a pair of opposite wider sides and transverse recesses extending in opposite direction to each other from said opposite sides and spaced from each other in the longitudinal direction of said key, each of said recesses in one side of said key being separated from an adjacent recess in the other side by a transverse web, each of said recesses having such a depth that the material remaining between the bottom of said recess in one side and the surface of the opposite side forms a slightly resilient joint, the remainder of said opposite sides of said key being disposed at all times substantially plane and parallel to each other, means for releasably securing said key to one of said elements, and means for exerting a pressure at least upon the opposite ends of said key in opposite substantially longitudinal directions thereof so as to deform said key be bending said joints and thereby displacing said remaining outer surfaces in transverse directions relative to each other and thereby to vary the size of said bearing clearance, said securing means being connnected to said slidable element and to said key at a substantially central part of its length, one side of said key facing said fixed element having a pair of said recesses adjacent to and at both lateral sides of said central part, and the other side of said key facing said slidable element also having a pair of recesses adjacent to but spaced at a greater distance from said central part, said two pairs of recesses defining two intermediate webs equally spaced from said central part.